United States Patent
Golander et al.

(10) Patent No.: US 9,678,670 B2
(45) Date of Patent: Jun. 13, 2017

(54) METHOD FOR COMPUTE ELEMENT STATE REPLICATION

(71) Applicant: PLEXISTOR LTD., Herzliya (IL)

(72) Inventors: Amit Golander, Tel-Aviv (IL); Sagi Manole, Petah-Tiqwa (IL)

(73) Assignee: PLEXISTOR LTD., Herzliya (IL)

( * ) Notice: Subject to any disclaimer, the term of this patent is extended or adjusted under 35 U.S.C. 154(b) by 35 days.

(21) Appl. No.: 14/753,052

(22) Filed: Jun. 29, 2015

(65) Prior Publication Data

US 2015/0378628 A1    Dec. 31, 2015

Related U.S. Application Data

(60) Provisional application No. 62/018,611, filed on Jun. 29, 2014.

(51) Int. Cl.
    *G06F 3/06* (2006.01)

(52) U.S. Cl.
    CPC .......... *G06F 3/0607* (2013.01); *G06F 3/0647* (2013.01); *G06F 3/0685* (2013.01)

(58) Field of Classification Search
    CPC .... G06F 3/0617; G06F 3/0635; G06F 3/0647; G06F 3/065; G06F 3/0607; G06F 3/0685; G06F 12/08; G06F 17/30123; G06F 17/303
    See application file for complete search history.

(56) References Cited

U.S. PATENT DOCUMENTS

| | | | |
|---|---|---|---|
| 6,154,813 A | 11/2000 | Martin | |
| 6,490,671 B1 | 12/2002 | Frank | |
| 7,702,698 B1 * | 4/2010 | Chakravarthy | G06F 17/30578 707/804 |
| 8,402,226 B1 | 3/2013 | Faibish | |
| 8,549,230 B1 | 10/2013 | Chatterjee | |
| 8,843,459 B1 * | 9/2014 | Aston | G06F 17/30067 707/694 |
| 9,274,941 B1 * | 3/2016 | Throop | G06F 12/023 711/117 |
| 2002/0083299 A1 | 6/2002 | Van Huben | |
| 2005/0235114 A1 | 10/2005 | Megiddo | |
| 2006/0010169 A1 * | 1/2006 | Kitamura | G06F 3/0605 711/117 |
| 2006/0026372 A1 | 2/2006 | Kim | |
| 2006/0195485 A1 | 8/2006 | Bird | |

(Continued)

OTHER PUBLICATIONS

Joel Coburn. Adrian M. Caulfield, Ameen Akel. Laura M. Grupp, Rajesh K. Gupta. Ranjit Jhala, Steven Swanson; NV-Heaps: Making Persistent Objects Fast and Safe with Next-Generation. Non-Volatile Memories: Newport Beach. California. USA—Mar. 5-11, 2011: ACM New York. NY. USA: ISBN: 978-1-4503-0266-1.

*Primary Examiner* — Hiep Nguyen

(74) *Attorney, Agent, or Firm* — Daniel J. Swirsky; AlphaPatent Associates Ltd.

(57) ABSTRACT

A method and system for compute element state replication is provided. The method includes transforming at least a subset of metadata of a source compute element from a memory tier of the source compute element to a block representation; within a destination compute element, mounting the block representation; reverse transforming the metadata to a memory tier of the destination compute element; and using the reverse transformed metadata to operate the destination compute element.

19 Claims, 9 Drawing Sheets

(56) References Cited

U.S. PATENT DOCUMENTS

| | | | |
|---|---|---|---|
| 2009/0089781 A1* | 4/2009 | Shingai | G06F 9/5088 |
| | | | 718/1 |
| 2009/0265403 A1 | 10/2009 | Fukumoto | |
| 2010/0281230 A1* | 11/2010 | Rabii | G06F 3/0605 |
| | | | 711/165 |
| 2010/0312955 A1 | 12/2010 | Hwang | |
| 2011/0010504 A1 | 1/2011 | Wang | |
| 2012/0023233 A1* | 1/2012 | Okamoto | G06F 9/4856 |
| | | | 709/226 |
| 2012/0059978 A1 | 3/2012 | Rosenband | |
| 2012/0143919 A1 | 6/2012 | Idicula | |
| 2012/0198121 A1 | 8/2012 | Bell, Jr. | |
| 2012/0254520 A1 | 10/2012 | Roh | |
| 2013/0080703 A1* | 3/2013 | Kumagai | G06F 9/5072 |
| | | | 711/117 |
| 2013/0138867 A1 | 5/2013 | Craft | |
| 2014/0281306 A1* | 9/2014 | Nakajima | G06F 3/0647 |
| | | | 711/162 |
| 2014/0304451 A1* | 10/2014 | Shibayama | G11C 11/5621 |
| | | | 711/103 |
| 2015/0212897 A1 | 7/2015 | Kottomtharayil | |
| 2015/0286436 A1 | 10/2015 | Olson | |

\* cited by examiner

METHOD FOR COMPUTE ELEMENT STATE REPLICATION

CROSS-REFERENCE TO RELATED APPLICATIONS

This application claims priority benefit from U.S. Provisional Patent Application No. 62/018,611, filed Jun. 29, 2014, the contents of which are incorporated herein by reference in their entirety.

FIELD OF THE INVENTION

This invention relates to the field of compute element state replication and in particular to state replication when using memory-based storage.

BACKGROUND

Traditional compute elements are typically deployed on physical or virtual machines, which in turn are also deployed on physical servers to which an administrator may have access to. A newer and alternative computing model is the cloud computing model. In cloud computing, whether private or public, the infrastructure is provided as a service. Physical or virtual machines enable working with local storage devices however the compute elements, such as Amazon EC2, are typically ephemeral, meaning that following shut down (e.g., to temporary cut down operational costs, during maintenance, power failure, load balancing, etc.) all local data is typically inaccessible and thus lost. This is true even if the local storage device is persistent by nature. Some complementary services, such as Amazon elastic block service (EBS), provide non-ephemeral storage options however these options are all limited in their performance and costly on bandwidth.

Some distributed systems, such as web server farms, consist of many compute elements that should all have the same data set, such as content, libraries etc. The problem of distributing such data to many compute elements grows with time, because public cloud economics allow for faster growth in the number of compute elements. Also, due to constantly changing business needs there is an increase in the frequency of updating and adoption of continuous deployment methodologies. Such deployments may benefit from copying a compute element state.

Compute element state replication and migration may be done by using the slow shared services such as Amazon EBS, or by copying the entire data from a source compute element device. However, these processes are typically inefficient. Moreover, copying from one device or service to another may be impossible in newly emerging memory based file systems in which data that is held in a memory based tier must be moved to a block based device or system.

SUMMARY

Embodiments of the present invention provide a method for efficient compute element state replication and/or migration which is possible to use between memory based devices or tiers and block based devices or tiers.

A method for compute element state replication according to an embodiment of the invention includes transforming at least a subset of metadata of a source compute element from a memory tier of the source compute element to a block representation; within a destination compute element, mounting the block representation; reverse transforming the metadata to a memory tier of the destination compute element; and using the reverse transformed metadata to operate the destination compute element.

The method may include reverse transforming a subset of the transformed metadata, e.g., reverse transforming a subset of the transformed metadata upon demand.

In one embodiment the method includes copying exclusive data to a storage service accessible to the destination compute element prior to transforming at least a subset of metadata of the source compute element.

Transforming metadata may include maintaining base addresses and offsets of the data and metadata and/or transforming memory pointers to a logical representation. Reverse transforming may include restoring the memory pointers based on the logical representation.

In some embodiments a step of freeze or snapshot is performed prior to transforming the at least subset of metadata.

In one embodiment the method includes transforming at least a subset of metadata of a source compute element from a memory tier of the source compute element to a block representation on a physical storage device and moving the physical storage device into the destination compute element.

In another embodiment the method includes transforming at least a subset of metadata of a source compute element from a memory tier of the source compute element to a block representation on a virtual storage service; replicating the virtual storage service; and reverse transforming the metadata from each replicated virtual storage service a memory tier of a corresponding destination compute element, to create multiple copies of the source compute element.

Another aspect of the invention provides a method for tiering. The method for tiering may include transforming metadata (typically a subset of the metadata, e.g., metadata related to cold files) from a memory based tier in a compute element to a block representation and copying the transformed metadata to a block based tier, thereby freeing space in the memory based tier.

In some embodiments the method includes reading the block representation in the block based tier upon an access request to data associated with the metadata and reverse transforming the metadata (typically a subset of the transformed metadata, i.e., metadata associated with accessed data) to the memory based tier.

In one embodiment the memory based tier is a virtual machine and the block based tier is an elastic block service.

In a another aspect of the invention there is provided a memory based storage system which includes a source compute element having a source memory tier; a destination compute element having a destination memory tier; and a processor to transform at least a subset of metadata of the source compute element from the source memory tier to a block representation; within the destination compute element, mount the block representation; and reverse transform the transformed metadata to the destination memory tier. In one embodiment the processor is to reverse transform a subset of the transformed metadata.

The system may also include a storage service accessible to the source compute element and to the destination compute element. The processor may copy exclusive data to the storage service prior to transforming at least a subset of metadata of the source compute element.

In one embodiment the destination compute element includes the storage service.

BRIEF DESCRIPTION OF THE DRAWINGS

The invention will now be described in relation to certain examples and embodiments with reference to the following illustrative drawings figures so that it may be more fully understood. In the drawings.

DETAILED DESCRIPTION

An exemplary system and exemplary methods according to embodiments of the invention will be described below.

Different embodiments are disclosed herein. Features of certain embodiments may be combined with features of other embodiments; thus certain embodiments may be combinations of features of multiple embodiments.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 schematically illustrates an exemplary processor operable in a computer data storage system according to embodiments of the invention.

Figure 1A:
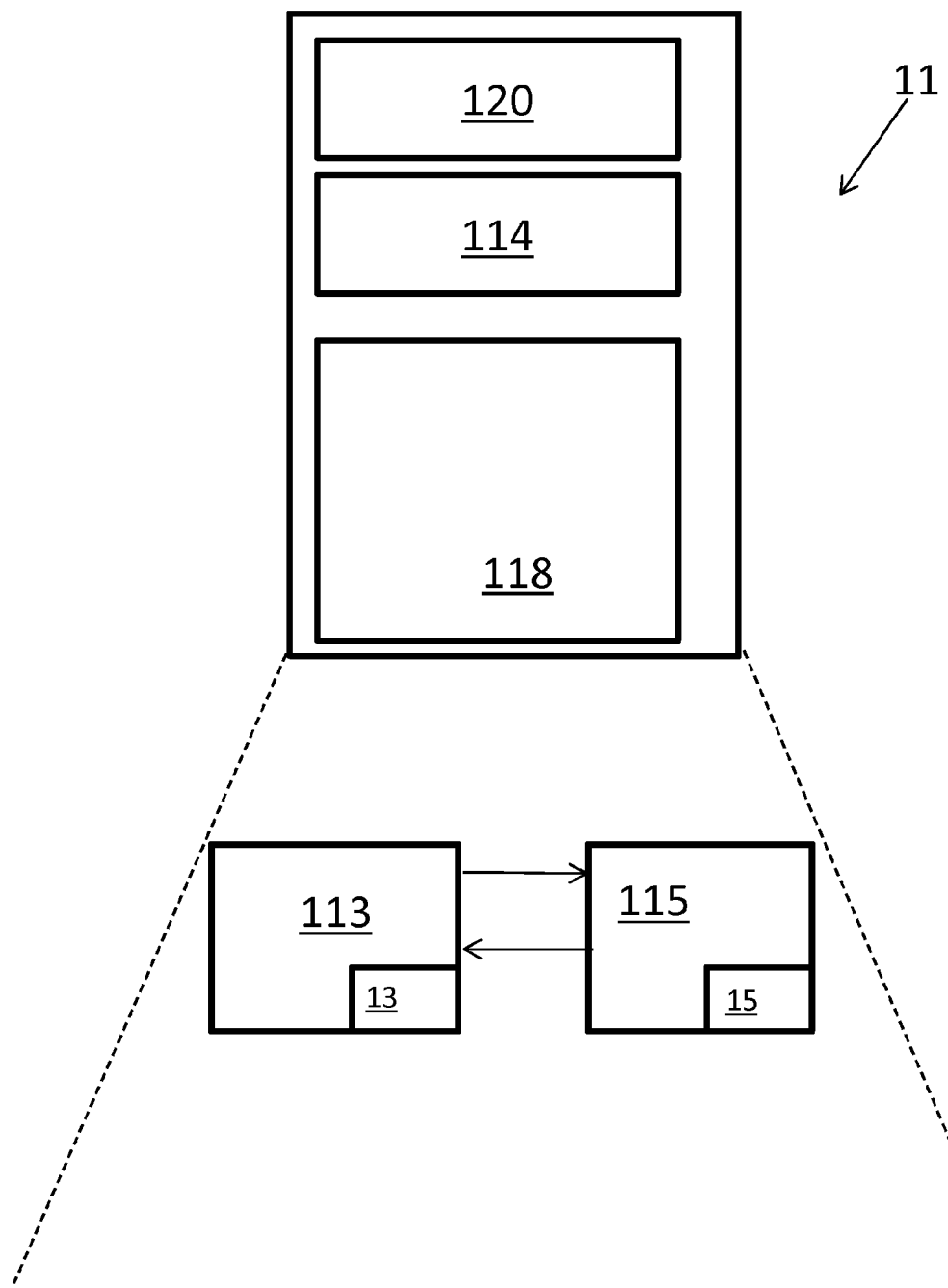
FIGS. 1A and 1B schematically illustrate a system for compute state replication according to embodiments of the invention.

The exemplary storage system includes a node or server having at least one central processing unit (CPU) core 11 and a plurality of storage type devices. Each storage type device or devices may make up a tier. The embodiment illustrated in FIG. 1A shows a system having two tiers; 113 and 115, however a system according to embodiments of the invention may include more tiers.

CPU 11 runs one or more applications 120 that use a file system 118 to store and retrieve data, typically through a standard interface 114, such as POSIX.

In one embodiment a first tier (e.g., tier 113) is a fast access tier which may include one or more storage devices of the same type. In one embodiment tier 113 includes one or more volatile or persistent memory device(s) 13 (e.g., dual in-line memory module (DIMM), or non-volatile DIMM (NVDIMM) card or brick over silicon photonics or PCIe or Infiniband or another, possibly proprietary ultra-low latency interconnect), which may also be referred to as persistent memory (PM) or non-volatile memory (NVM). A second tier (e.g., tier 115) is a relatively slower access tier which may include one or more storage devices of a different type than the storage devices in tier 113. In one embodiment tier 115 includes a block based storage device 15 (e.g., Flash-based SSD; a local device or a remote device such as "NVMe over fabric").

In one embodiment storage device 15 or tier 115 may be or may include a service. Embodiments of the invention relating to storage devices/services may include storage services/devices and the term storage service may include in its meaning a storage device.

An example of a storage service is Amazon EBS. Services and system that support File or object level access may also be used. In such cases block numbers can be encoded as offsets within the saved file or object. Examples of service systems that can be used according to embodiments of the invention include NFS, SMB, Ceph, Amazon S3, Openstack Swift and other RESTful object services.

A fast access storage type device (e.g., memory device 13) may be, for example, 1,000 faster per access than the slower access storage type device or service (e.g., block based storage device 15).

Elements in tier 113 may point to each other, since tier 113 is typically memory mapped and byte addressable.

Data in a memory is managed in typically (but not necessarily) uniformly sized units known as pages. Although embodiments of the invention relate to management of data in all types and sizes of units, for simplicity's sake, reference may be made to "pages" when discussing data throughout the specification. A page may include representation of data such as metadata, as well as the data itself.

Thus, file system 118 leverages two or more storage tiers in which the faster tier (tier 113) is memory based.

Metadata, which is small and relational in nature, is typically maintained in the faster, memory addressable tier (tier 113). Data is typically written to the faster tier (tier 113), but is later copied to a slower tier (tier 115), if and when the faster tier is about to run out of free space.

In a tiered system according to embodiments of the invention "hot" data (e.g., data requested multiple times within the past minutes) is typically stored in the fast access tier and moved by CPU 11 to a slower access tier if the data becomes "warm" (e.g., data accessed multiple times within the past week) or "cold" (e.g., data which isn't accessed for a long period of time).

Figure 1B:
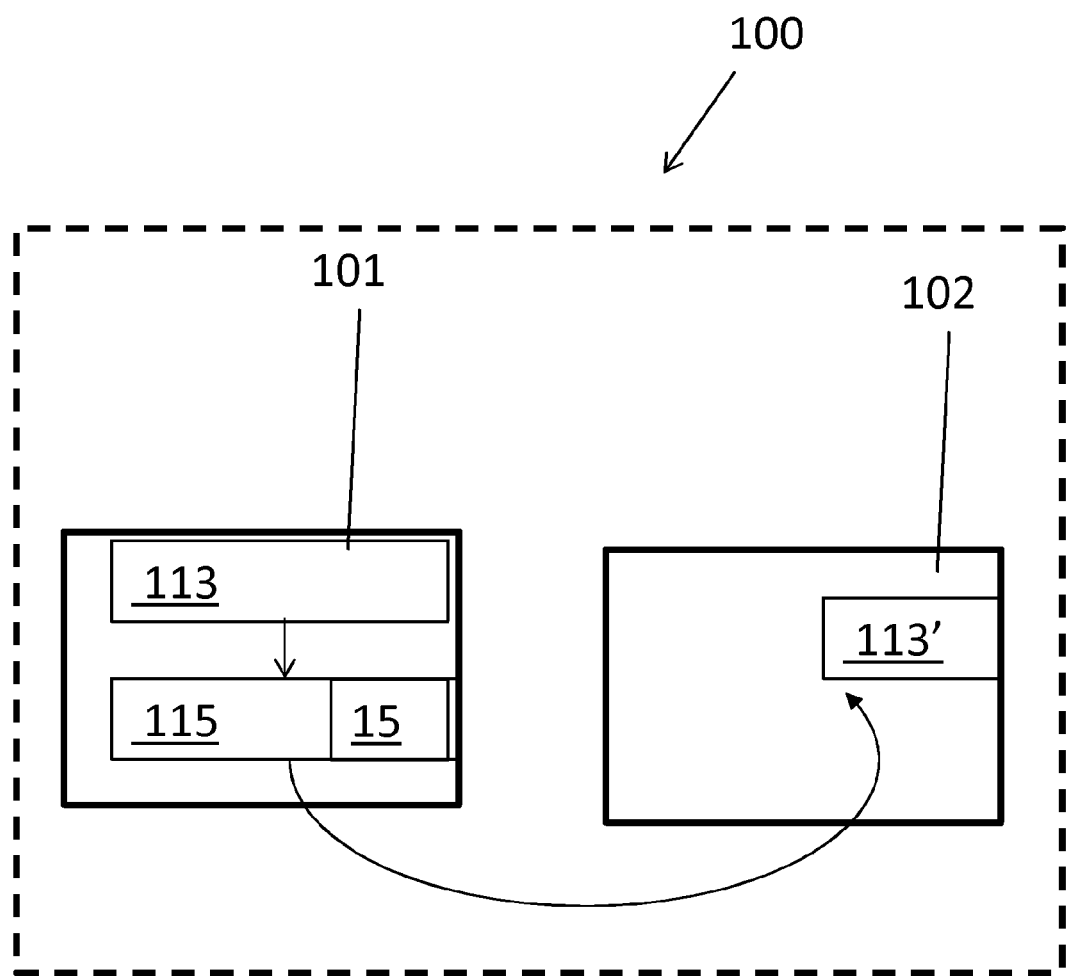

In one embodiment, which is schematically illustrated in FIG. 1B, a memory based storage system 100 includes a source compute element 101 which includes a memory tier and a destination compute element 102 which includes a destination memory tier 113'.

Either source compute element 101 and/or destination compute element 102 may include a process, container, physical or virtual machine.

One or more block based storage device(s) or service(s) 15 may comprise the block based tier 115 and reside on the same server as the source compute element 101 or in another system which is in communication with the source compute element 101.

In one embodiment the system 100 includes a processor (e.g., CPU 11 in FIG. 1A) to transform metadata of the source compute element 101 from a memory representation in the source memory tier 113 to a block representation (for example, on storage device or service 15 or, for example, implemented as offsets within a file or object). A processor within the destination compute element 102 then mounts the block representation and reverse transforms the metadata to the destination memory tier 113'. Thus, the compute element state of the source compute element 101 can be migrated to destination compute element 102.

Maintaining the compute element state in a low access tier in block representation, which is a typically more standardized representation, makes it easier to share. Migrating or replicating the compute element state may be desirable in cases of planned interruptions of work, for example, when pausing an ephemeral compute element (so as to reduce compute operational expenses) or during upgrade or maintenance of systems.

Figure 2:
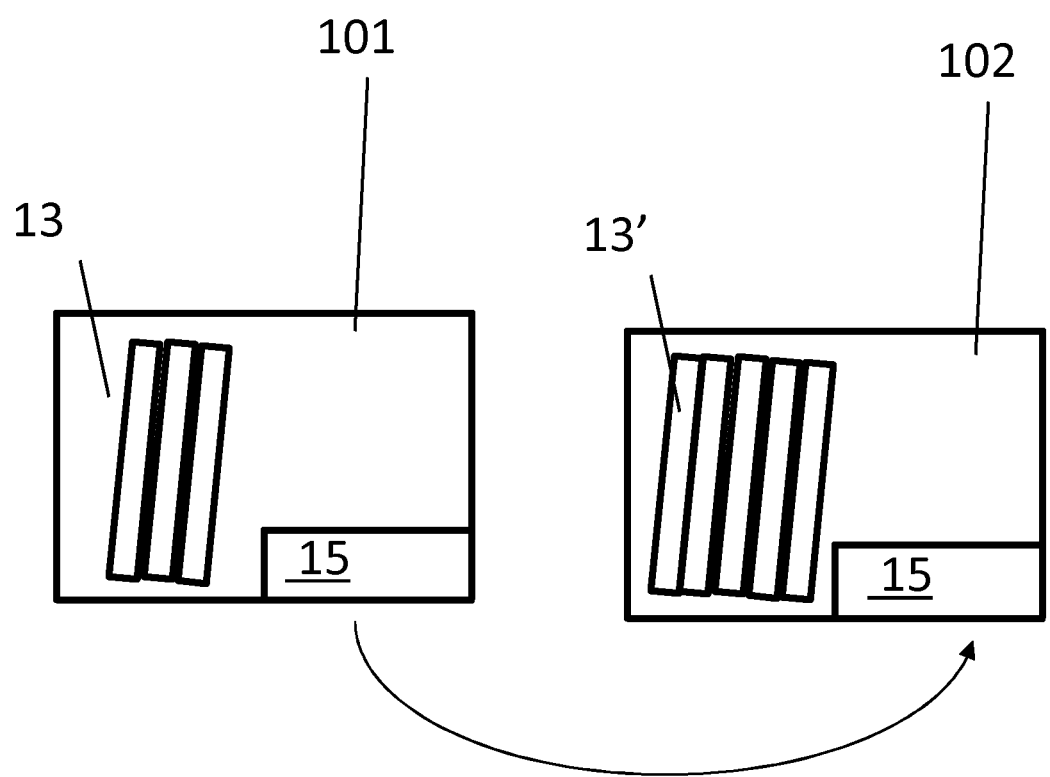
FIG. 2 schematically illustrates a system operable using a method according to one embodiment of the invention.

In one example which is schematically illustrated in FIG. 2, when a server (e.g. first system 101) having one or more non-volatile memory based device(s) 13 and one or more block based storage device(s) 15 is upgraded to a second system 102 (e.g., upgrade from an Intel XEON v2 based server to an Intel XEON v3 based server) data needs to be migrated from the old platform to the new platform to avoid losing data. In such a scenario the non-volatile memory based devices 13 from the first system 101 (e.g., DDR3 NVDIMM cards used with XEON v2) may not fit the slots 13' available in the second system 102 (e.g., the DDR4 NVDIMM slots available in the XEON v3 server) and they may need to be replaced. Methods according to embodiments of the invention provide a solution to this problem.

Replicating and then migrating data may be done by CPU 11, according to an embodiment of the invention, by transforming metadata from the non-volatile memory based devices 13 to a block representation on block based storage device(s) 15 in the first system 101. Device(s) 15 may then be physically moved to the second system 101. A processor may mount the block representation on device(s) 15 once it has been moved to the second system 101 and reverse transform the metadata to new memory based devices in slots 13'.

In another embodiment device(s) 15 is accessed over a network accessible by both first system 101 and second system 102, so that only the logical ownership is moved rather than physically moving a device.

Replicating the compute element state of the source compute element and being able to migrate it to a destination compute element, as described above, enables easily moving data from one platform to another without compatibility issues that may rise from the different platforms.

Figure 3:
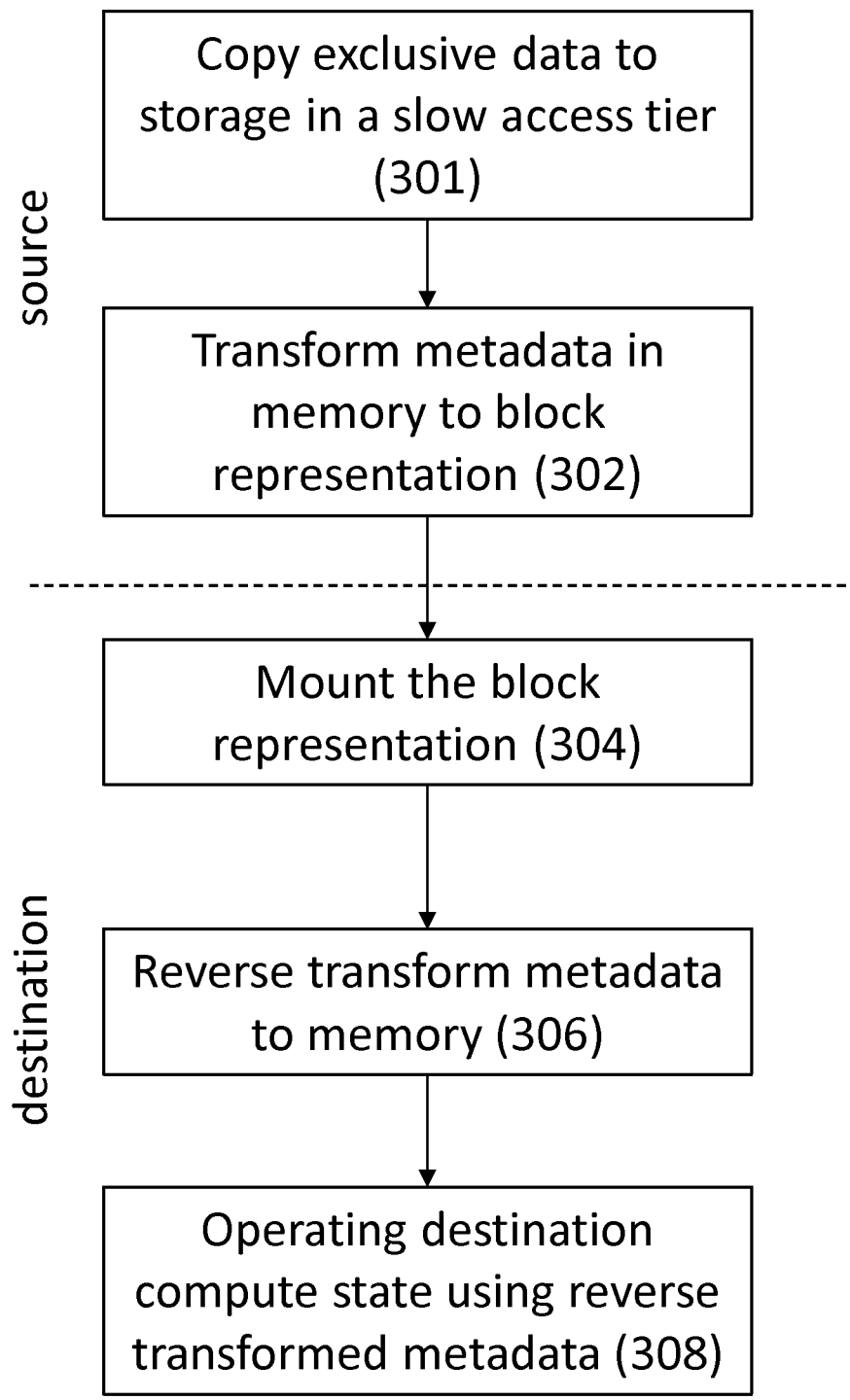
FIG. 3 schematically illustrates a method for compute state replication, according to an embodiment of the invention.

A method for compute element state replication and/or migration, according to one embodiment of the invention, is schematically illustrated in FIG. 3. According to one embodiment, data residing on a fast access tier is copied to storage in a slow access tier (301). Data is copied from a typically memory based fast access tier to a typically block based storage tier only if this data has not been copied yet, namely, if the data is exclusive data (i.e., exclusive to the fast access tier). The exclusive data is copied to a system or service that may be later accessed by a destination compute element.

The next step includes transforming metadata of a source compute element (302) from a memory representation on a memory tier of the source compute element to a block representation (which may include writing the transformed metadata to a block based storage device or otherwise representing the metadata, e.g., by encoding block numbers as offsets within a file or an object saved).

Within a destination compute element, the block representation is mounted (304) and the metadata is then reverse transformed to a memory tier of the destination compute element (306). The destination compute element may then be operated using the reverse transformed metadata (308), e.g., the destination compute element may be a server running an application and metadata may be reverse transformed only once the server starts running the application.

In one embodiment subsets of the metadata (rather than the entire metadata) may be reversed transformed (possibly, only reverse-transformed when they are required, for example, after the destination compute element starts running applications).

In one embodiment transforming metadata includes compressing the metadata.

In another embodiment transforming metadata includes maintaining base addresses and offsets of the data and/or metadata in the memory based tier. Using the base addresses and offsets while reverse transforming enables reconstructing the source compute state on a destination compute element even if the compute element does not include the same address space as the source compute element.

Figure 4:
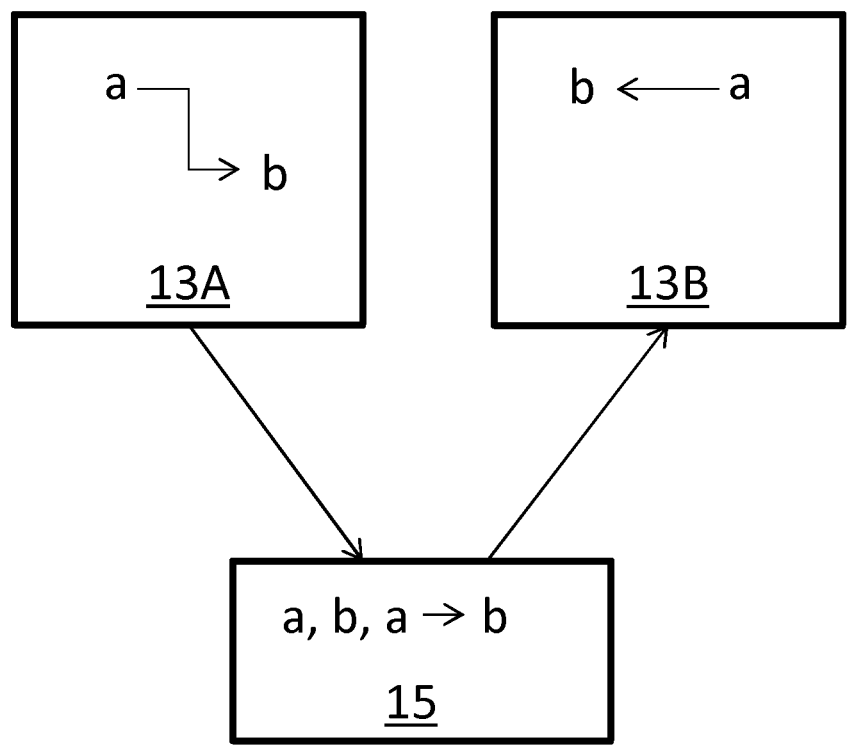
FIG. 4 schematically illustrates transformation and reverse transformation of metadata according to one embodiment of the invention.

In another embodiment which is schematically illustrated in FIG. 4, transforming metadata includes transforming memory pointers (e.g., the pointer between a and b in memory based device 13A) to a logical representation (e.g., on block based storage device 15) and reverse transforming includes restoring the memory pointers based on the logical representation once a new memory device (e.g., memory based device 13B) and memory addresses are allocated.

In FIG. 4, a and b may stand for data and metadata or both a and b may stand for metadata.

Reverse transforming may occur by subsets and/or upon demand. For example, an initial subset, such as the file system superblock, inode table, directories etc., may first be reversed transformed and then metadata may be reversed transformed in an "on demand" fashion for specific files that are being accessed.

Figure 5:
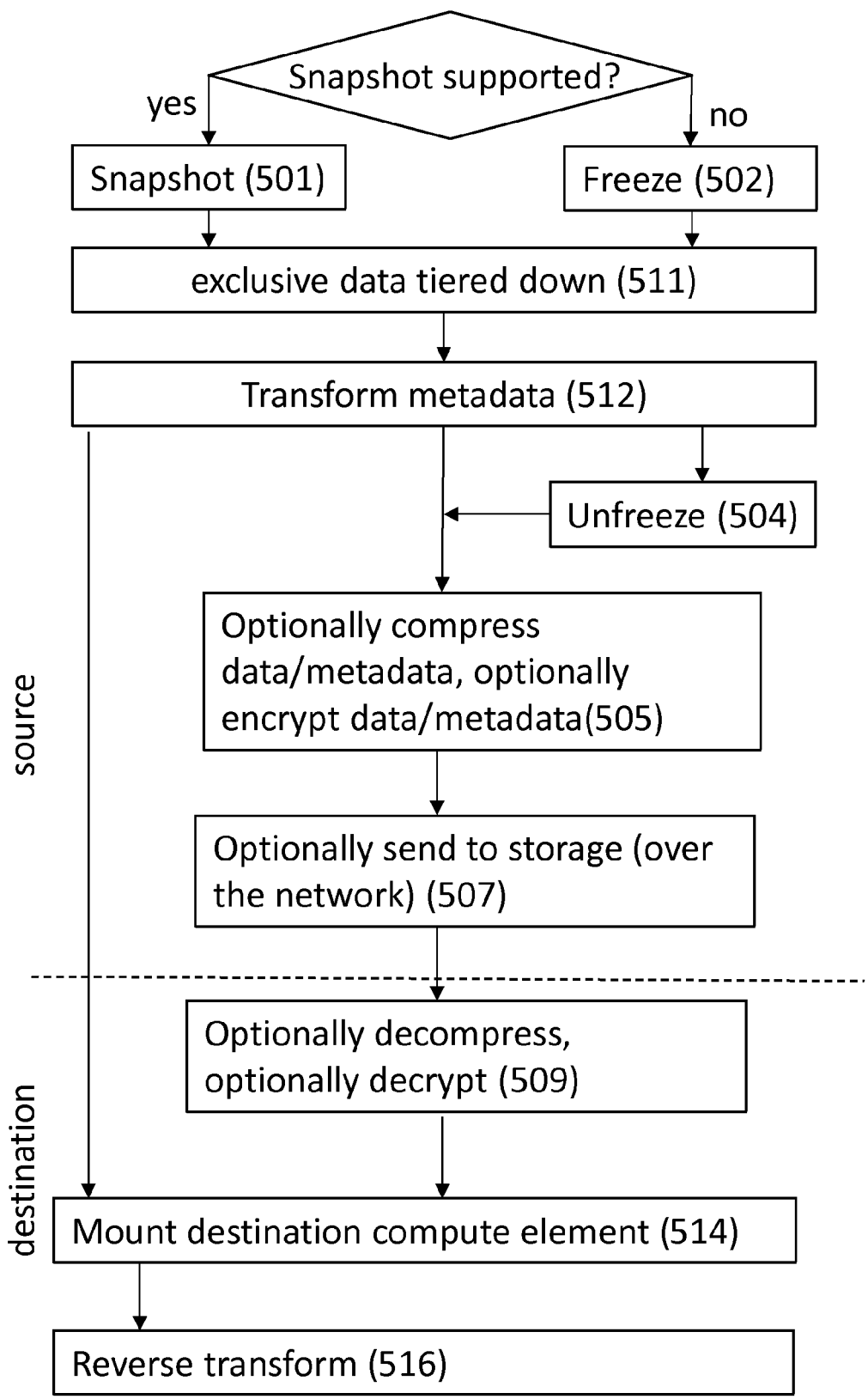
FIG. 5 schematically illustrates a method for compute state replication, according to another embodiment of the invention.

A method for compute element state migration may include a step to make data consistent (e.g., by freeze or snapshot) prior to transforming the metadata, for example, as schematically described in FIG. 5.

According to one embodiment, in a device or service (also referred to as a source compute element) supporting snapshot capability the state of the data is made consistent using a snapshot (501). In systems not supporting snapshot (such as ramfs and pmfs) a freeze file system function may be used (502) to maintain a consistent state of the data.

Once the state of the data of the compute element is made consistent, exclusive data may be tiered down (511) (e.g., copied from a fast access memory based tier (e.g., tier 113) to a slower access tier (e.g., tier 115) as described above). Next, the metadata of the source compute element is transformed from a memory tier of the source compute element to a block representation (512).

Snapshot is typically used on-line thus work may be resumed on-line in the source compute element without delay after snapshot. Freezing for the entire duration of copying exclusive data and transforming the metadata, however, is typically preformed off-line thus unfreeze is preformed (504) after transformation of the metadata so that work may be resumed on the source compute element.

Prior to being sent to a slow access tier (e.g., tier 115), or to a destination device or service, the data and transformed metadata may be compressed (for example using Lempel-Ziv and Hoffman) and/or encrypted (e.g., using AES) (505) and then the metadata in block representation is sent (optionally over the network) to a storage device (507). The compressed and/or encrypted data and transformed metadata should then be decrypted and/or decompressed accordingly (509).

Within a destination compute element, the block representation is mounted (514) and the transformed metadata is then reverse transformed to a memory tier of the destination compute element (516). As described above, reverse transforming may be done in subsets and/or upon demand (e.g., as metadata is traversed).

In some embodiments the metadata is reverse transformed to multiple devices or virtual services (e.g., virtual machines (VMs)) to obtain multiple copies of the compute element state. In some embodiments multiple copies of the block representation may be produced to obtain multiple copies of the compute element.

Methods as describe above enable to resume work after shutdown of a system (as will be further explained with reference to FIG. 6) and/or to replicate multiple templates (as will be further explained with reference to FIG. 7).

Using the methods described above and as schematically demonstrated in FIG. 6 "platform" migration in a cloud environment is enabled. Methods according to embodiments of the invention enable replicating the compute element state from a source element, (e.g., virtual machine VM1 running Amazon EC2, for example) by transforming metadata from VM1 to a block representation on a virtual storage service 615 (such as Amazon EBS). At any desired time in the future storage service 615 can be mounted to reverse transform the metadata in a new VM (VM2) thereby migrating the compute state from VM1 to VM2 according to embodiments of the invention.

Figure 6:
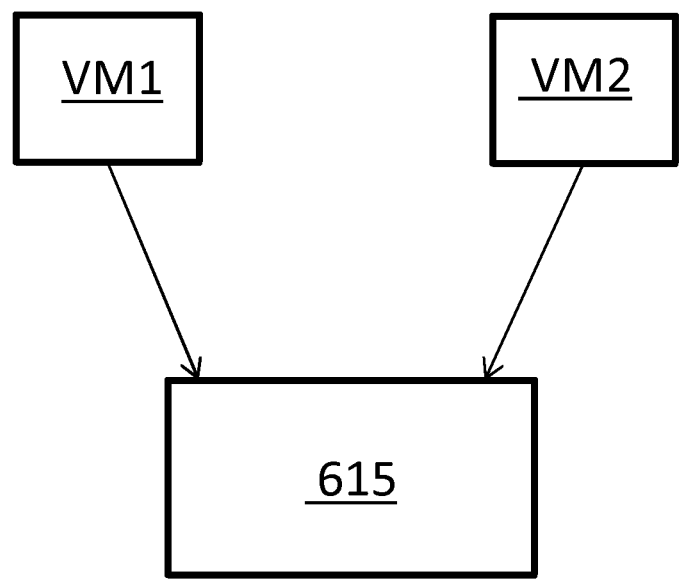
FIG. 6 schematically illustrates compute state migration according to an embodiment of the invention.

The method demonstrated in FIG. 6 may be applied also to a system having one or more physical components.

Figure 7:
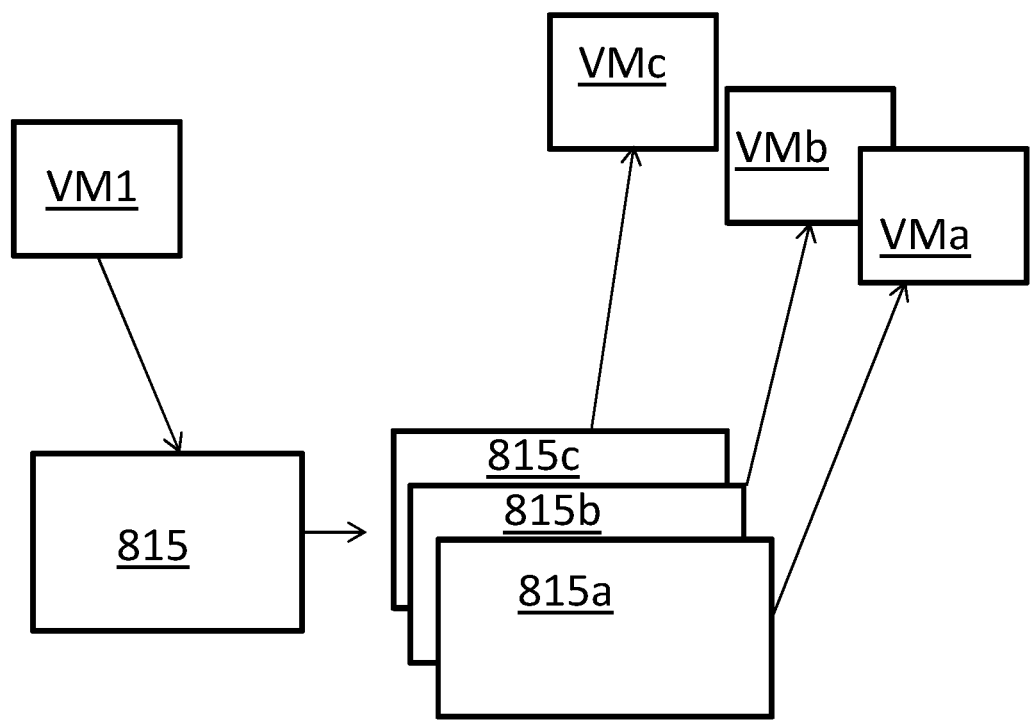
FIG. 7 schematically illustrates compute state replication according to an embodiment of the invention.

In another embodiment schematically demonstrated in FIG. 7 methods according to embodiments of the invention enable template distribution.

In one embodiment the compute state of a first VM (VM1) (which can also act as a memory based tier) is replicated by copying exclusive data and then transforming the metadata from VM1 to a block representation on a typically logical storage volume 815. The data and transformed metadata can be copied onto one or more storage volume(s) 815a, 815b, 815c etc., which may then be mounted and the metadata may be reverse transformed onto one or more VM(s) (from 815a to VMa, from 815b to VMb, from 815c to VMc etc.), thus optionally replicating a compute state onto several compute elements.

The method demonstrated in FIG. 7 may be applied also to a system having one or more physical components.

Such a mechanism can be used, for instance, as a distribution mechanism in a continuous deployment environment, in which a new server template has to be deployed in large numbers.

Figure 8:
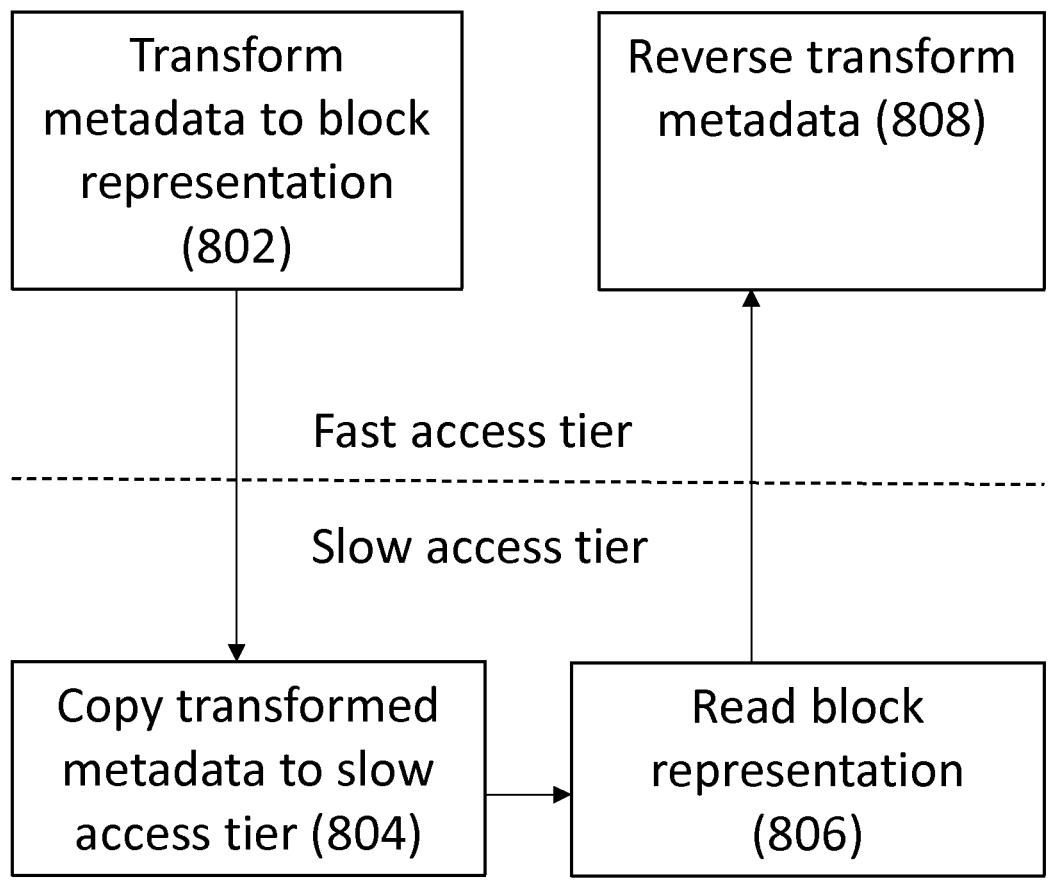
FIG. 8 schematically illustrates a method for tiering according to an embodiment of the invention.

In one embodiment, which is schematically illustrated in FIG. 8, embodiments of the invention can be used for tiering, typically for tiering metadata, in a system having a memory based tier (typically a fast access tier) and a block based tier (typically a slower access tier).

In one embodiment the method may include selectively "tiering down" subsets of metadata, e.g., metadata associated with cold (seldom accessed files) files.

The method may include transforming metadata from a memory based tier (which is a relatively fast access tier) in a compute element to a block representation (802). For example, metadata associated with cold large files may be selectively transformed. The transformed metadata is then copied to a block based tier (which is a relatively slower and cheaper access tier) (804), thereby enabling tiering metadata from a memory based tier to a block based tier and freeing up space in the fast access tier.

Typically, subsets of the metadata may be occasionally transformed and copied to the slow access tier. For example, in order to free up space in the fast access tier, metadata related to cold files may be "tiered down" using to this method.

In one embodiment a subset of the transformed metadata may be reverse transformed back to the memory based tier. For example, metadata associated with accessed data may be "tiered up".

If there is an access request to data associated with the metadata stored in the slow access tier (block based tier) the relevant metadata may be "tiered up" on demand by reading the block or block representation in the slow access tier (block based tier) (806) and reverse transforming the metadata (808) to the fast access tier (memory based tier).

In one example a fast access tier may include a VM memory and the slower access tier may include an EBS volume. Migration of a compute element state from the VM to the EBS according to embodiments of the invention may be done periodically or according to system requirements. The same may happen, according to embodiments of the invention, in a system having one or more physical devices.

What is claimed is:

1. A method for compute element state replication, the method comprising:
   transforming at least a subset of metadata of a source compute element from a memory based tier of the source compute element to a block representation;
   within a destination compute element, mounting the block represented metadata;
   reverse transforming the metadata to a memory based tier of the destination compute element; and
   using the reverse transformed metadata to operate the destination compute element.

2. The method of claim 1 comprising copying data exclusive to the memory based tier, to a storage service accessible to the destination compute element prior to transforming at least a subset of metadata of the source compute element.

3. The method of claim 1 wherein transforming metadata comprises maintaining base addresses and offsets of the data and metadata.

4. The method of claim 1 wherein transforming metadata comprises transforming memory pointers to a logical representation and reverse transforming comprises restoring the memory pointers based on the logical representation.

5. The method of claim 1 comprising a step of freeze or snapshot prior to transforming the at least subset of metadata.

6. The method of claim 1 comprising:
   transforming at least a subset of metadata of the source compute element from the memory based tier of the source compute element to a block representation on a physical storage device; and moving the physical storage device into the destination compute element.

7. The method of claim 1 comprising:
transforming at least a subset of metadata of the source compute element from the memory based tier of the source compute element to a block representation on a virtual storage service;
replicating the virtual storage service; and
reverse transforming the metadata from the replicated virtual storage service to a memory based tier of a destination compute element corresponding to the replicated virtual storage service, to create multiple copies of the source compute element.

8. The method of claim 1 wherein reverse transforming the metadata comprises reverse transforming a subset of the transformed metadata.

9. The method of claim 8 comprising reverse transforming a subset of the transformed metadata upon demand.

10. A method for tiering, the method comprising:
transforming metadata from a memory based tier in a source compute element to a block representation;
copying the transformed metadata to a block based tier;
reading the block representation in the block based tier upon an access request to data associated with the metadata; and
reverse transforming the metadata to a memory based tier in a destination compute element.

11. The method of claim 10 comprising transforming a subset of the metadata from the memory based tier.

12. The method of claim 11 wherein the subset of metadata comprises metadata related to cold files.

13. The method of claim 10 comprising reverse transforming a subset of the transformed metadata.

14. The method of claim 13 wherein the subset of reversed transformed metadata comprises metadata associated with accessed data.

15. The method of claim 10 wherein the memory based tier comprises a virtual machine and wherein the block based tier comprises an elastic block service.

16. A memory based storage system, the system comprising:
a source compute element comprising a source memory based tier;
a destination compute element comprising a destination memory based tier; and
a processor to
transform at least a subset of metadata of the source compute element from the source memory based tier to a block representation;
within the destination compute element, mount the block represented metadata; and
reverse transform the transformed metadata to the destination memory based tier.

17. The system of claim 16 further comprising a storage service accessible to the source compute element and to the destination compute element and wherein the processor is to copy exclusive data to the storage service prior to transforming at least a subset of metadata of the source compute element.

18. The system of claim 17 wherein the destination compute element comprises the storage service.

19. The system of claim 16 wherein the processor is to reverse transform a subset of the transformed metadata.

* * * * *